(No Model.) 2 Sheets—Sheet 1.

E. H. SAWIN.
TENONING MACHINE.

No. 246,423. Patented Aug. 30, 1881.

WITNESSES.
Henry H. Parker
Henry L. Washburn.

INVENTOR.
Edward H. Sawin (No Model.) 2 Sheets—Sheet 2.

E. H. SAWIN.
TENONING MACHINE.

No. 246,423. Patented Aug. 30, 1881.

WITNESSES.
H. H. Parker
Henry L. Washburn.

INVENTOR.
Edward H. Sawin

UNITED STATES PATENT OFFICE.

EDWARD H. SAWIN, OF GARDNER, MASSACHUSETTS.

TENONING-MACHINE.

SPECIFICATION forming part of Letters Patent No. 246,423, dated August 30, 1881.

Application filed October 19, 1880. (No model.)

*To all whom it may concern:*

Be it known that I, EDWARD H. SAWIN, of Gardner, in the county of Worcester and State of Massachusetts, have invented a new and useful Improvement in Tenoning-Machines, of which the following is a specification.

My invention relates to improvements in machines for cutting shoulders upon the inside edges of tenons when two or more tenons are cut at the same time.

Heretofore the shoulders on the inside edges of the tenons of chair-backs or any similar pieces with shoulders have been cut by hand or cut separately by machine and the parts put together afterward. In the case of chair-backs made of one piece with two or more tenons to to be cut on the ends, the piece has been divided into parts, tenons cut on each part, and then the whole put together again.

By the use of my invention any chair-back or any piece or pieces with two or more tenons on the end or ends requiring shoulders cut on the inside edges of the tenons can be cut after the parts are put together or without separating into parts, whereby a saving of time is effected and better work done. I attain these objects by the mechanism illustrated in the accompanying drawings, in which—

Figure 1:
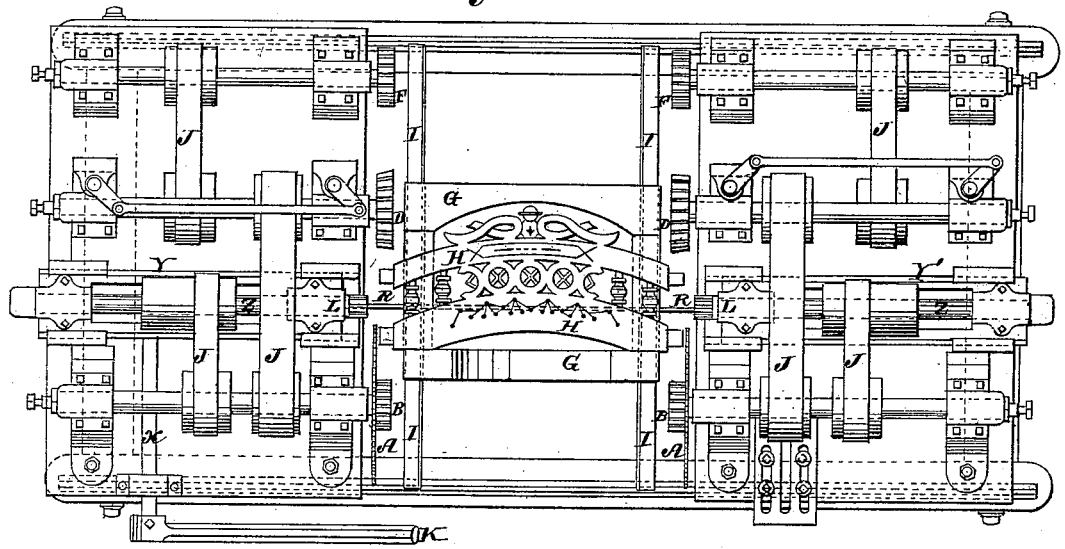
Figure 2:
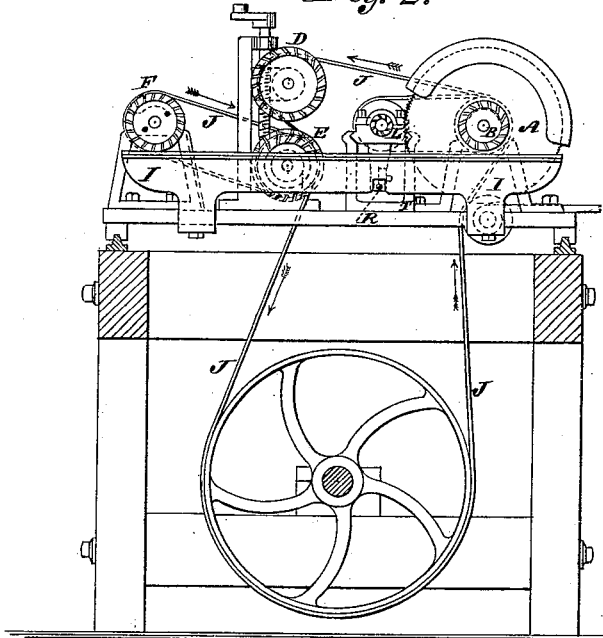
Figure 3:
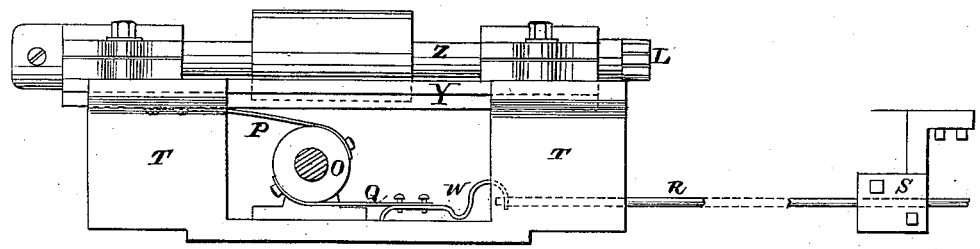
Figure 4:
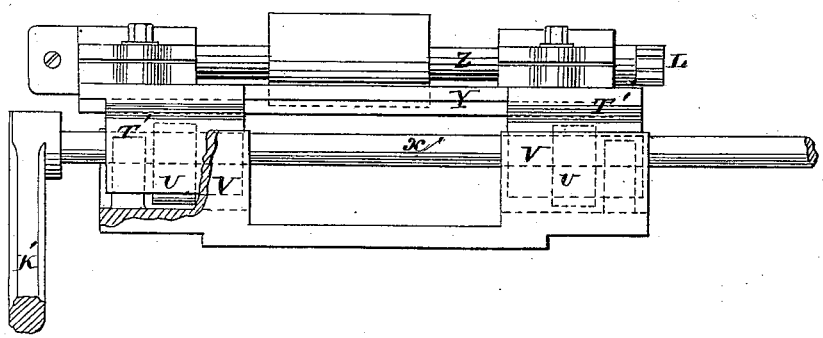
Figure 5:
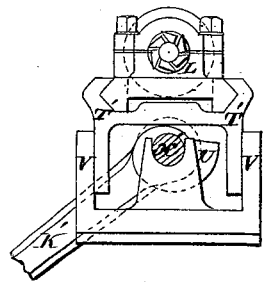

Figure 1 is a plan view of the machine with my improvement attached. Fig. 2 is a central vertical sectional view of the same. Figs. 3 and 4 are detail views of the mechanism by which the cutter is operated in cutting the shoulders upon the inside edges of the tenons. Fig. 5 is an end view of Fig. 4.

Similar letters refer to similar parts throughout the several figures.

A A are saws, by which the tenons to be cut are reduced to the desired length.

B B are cutters, which form two of the outside shoulders on one side of the tenons. D D and similar cutters below (E, shown in Fig. 2) reduce the tenons to the desired thickness.

F F are cutters, which form the remaining two outside shoulders opposite those formed by cutters B B.

L L are cutters, which, when brought into position, form the inside shoulders of the tenons.

H H is a chair-back in position to be cut. G G is the carriage to hold the same. I I are ways upon which the carriage G G moves. J J are belts for driving the saws and cutters above mentioned.

K is a handle, which rotates shaft X, which, when rotated, moves the straps P and Q, both fastened at one end to the enlargement O of the shaft X, the other end of P being fastened to the slide Y, carrying the cutter L on one side of the machine, and the other end of Q being connected by means of the spring W, rod R, and clamp S to the slide Y', carrying the cutter L on the other side of the machine.

In Figs. 4 and 5 the handle K' rotates the shaft X', moving the cams U U.

T' is a movable part of the machine which holds the arbor carrying the cutter L.

V V are ways, bolted to the frame of the machine, in which the part T' slides up and down.

Z is the shaft upon which is fastened the cutter L.

My invention is used and operated in the following manner, viz: The carriage G G, moving upon the ways I I, is placed in such a position that the piece to be cut is brought between the saws A A and the cutters D D. The operator draws the carriage toward him, and the saws A A reduce the tenons to the desired length, and the cutters B B form two of the outside shoulders of the tenons. The carriage is then pushed forward, carrying the piece to be cut between the cutters D D and those directly under D D, (E, shown in Fig. 2,) which reduce the tenons to the desired thickness. The carriage G G is pushed forward still farther until the piece to be cut is brought in contact with the cutters F F, which form the remaining two outside shoulders opposite those formed by the cutters B B. The carriage G G is then brought back to the position shown in Fig. 1. By depressing the handle K the shaft X and enlargement O, Fig. 3, is rotated. By this rotation the slide Y, connected by the strap P with the enlargement O, is moved in one direction, and the slide Y', connected by the clamp S, rod R, spring W, and strap Q to enlargement O, is moved in an opposite direction, thus bringing the cutters L L toward each other and in a line with the cutters D D and B B. Then, moving the carriage G G backward and forward upon the slide I I, the cutters L L form the inside shoulders of the tenons. Releasing the handle K, weights or springs bring the cutters L L back to their original position. In Figs. 4 and 5 another way of moving the cutters L L is shown. Depressing the handle K', the cams U U upon the shaft X' raise the cutter L into position by pressing upon the movable part T', which slides up and down in the ways V V. Upon the continuation of the shaft X', similar cams raise the cutter L on the other side of the machine.

While I have here described two methods by which the cutters L L may be brought into the desired position for forming the inside shoulders of the tenons, I do not confine myself to said methods, as I am aware that the same result may be produced by several different mechanical devices.

In the accompanying drawings a double tenoning-machine is illustrated; but my improvement is also applicable to a single machine—i. e., a machine cutting one end at a time.

What I claim, and desire to secure by Letters Patent, is—

1. The supporting-guideways, as I I, combined with cutters, as L L, arranged to cut out a portion of the tenons, and operated by mechanism substantially as described, in combination with the crosscut-saws A A and the rotating cutters, which form two of the outside shoulders of the tenons, substantially as described.

2. The supporting-guideways, as I I, combined with cutters, as L L, arranged to cut out a portion of the tenons and operated by mechanism substantially as described, in combination with rotating cutters arranged vertically in pairs, and between which the tenons move, substantially as described.

3. The supporting-guideways, as I I, combined with cutters, as L L, arranged to cut out a portion of the tenons, and operated by mechanism substantially as described, in combination with the rotating cutters, which form the remaining two outside shoulders of the tenons, substantially as described.

EDWARD H. SAWIN.

Witnesses:
HENRY L. WASHBURN,
ROBERT JOHNSON.